Dec. 18, 1956   R. K. REMER   2,774,679
TREATING OF PLASTIC SURFACES
Filed Feb. 10, 1953
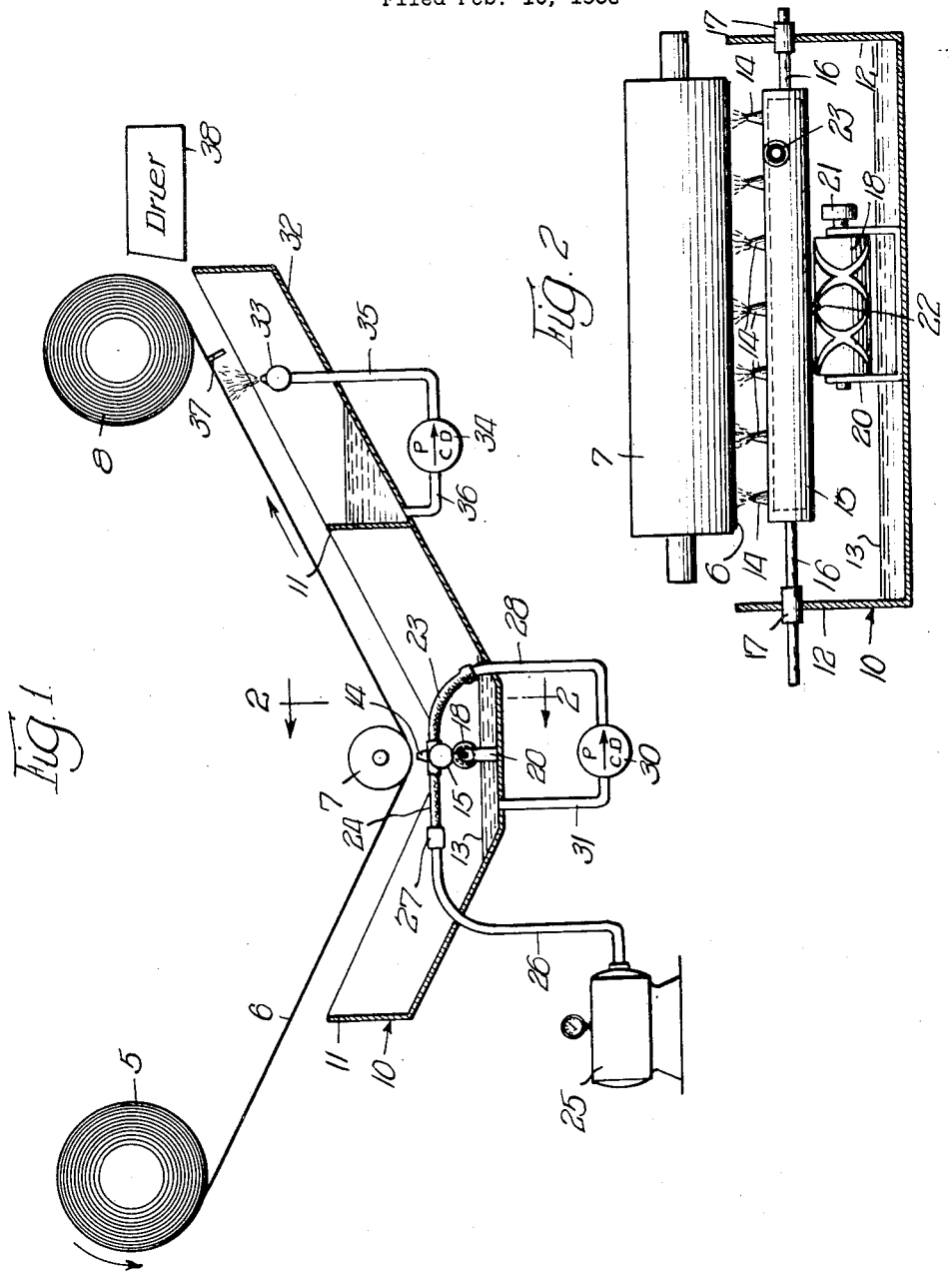
INVENTOR.
Robert K. Remer,
BY
Cromwell, Greist & Warden
Attys.

United States Patent Office 2,774,679
Patented Dec. 18, 1956

2,774,679

TREATING OF PLASTIC SURFACES

Robert K. Remer, St. Charles, Ill., assignor to The Strathmore Company, Aurora, Ill., a copartnership Application February 10, 1953, Serial No. 336,034

2 Claims. (Cl. 117—11)

My invention relates generally to the treatment of the surfaces of various plastic materials by subjecting such surfaces to sprays of honing liquids with or without agents which have a desired modifying effect on the plastic surfaces. More particularly, the invention pertains to a treatment of various plastics in the form of sheets or continuous films which comprises continuously passing or web feeding such sheets or films past sprays of honing liquids which strike the surface of the sheets or films and impart thereto and develop thereon surfaces having characteristics which render them suitable for various uses.

I have found according to my present invention that surfaces having unique and novel characteristics can be developed on plastic sheets or films by spraying honing liquids onto the surfaces of the films or sheets. Honing liquids are liquids which contain suspensions or dispersions of particles which are abrasive with respect to the plastic films undergoing treatment. In addition to the mechanical or physical honing action which can be obtained by using only abrasive materials in the honing liquids, I have further found that various modifying agents can be incorporated into such honing liquids so as to extend the range of the surface properties that can be obtained. Under the microscope, the surfaces which may be obtained appear to be composed of a multitude of knife edges, the exact nature and quality of which may be suitably controlled. Preferably, an agent is incorporated in the honing liquid, in addition to the abrasive agent therein, which has a desired modifying action on the film such, for example, as a solvent action, a hydrolyzing action, a coating action, etc. Plastic sheets or films which have been processed according to my invention have been found to have many new uses because of the distinctive properties of the surfaces which can be developed on them.

The object of the invention, generally stated, is a novel method of treating the surfaces of plastic materials, particularly plastic sheets and films, by subjecting the same to sprays of honing liquids containing particles of suitable abrasive properties with or without modifying agents capable of modifying or attacking the surface of the plastic being honed.

A further object of the invention is the provision of plastic sheets and films having surfaces exhibiting unique properties which are obtained by treating the plastic materials in accordance with the honing treatments of the present invention.

A further object of the invention is apparatus for treating traveling webs of plastic films with honing liquids.

Certain other objects of the invention will, in part, be obvious and will, in part, appear hereinafter.

For a more complete understanding of the nature and scope of this invention, reference may now be had to the following detailed description thereof taken in connection with the accompanying drawings wherein:

Fig. 1 is a diagrammatic view of one apparatus which can be satisfactorily used to carry out the honing treatment of the present invention; and Fig. 2 is a view on enlarged scale taken on line 2—2. Cellulose acetate film has been treated or honed in accordance with the present invention and a surface developed thereon which makes the film particularly suitable for use in connection with writing duplicators or devices of the type in which written matter or drawings may be put on the duplicator or writing device and removed therefrom when desired without erasure. Such duplicators in writing devices are described, for example, in Patent No. 1,555,642, dated September 29, 1925, and Patent No. 2,074,855, dated March 23, 1937. In general, such writing pads or duplicators consist of a backing member, the top surface of which is waxy, somewhat tacky, and dark colored, into which an impression can be made by a stylus or other smooth pointed instrument. On top of the backing member is laid a light colored translucent or semi-transparent film which is usually thin and very pliable and may be formed, for example, out of a material such as rubber hydrochloride sold commercially under the trade name "Pliofilm." In order to obtain satisfactory writing properties, the film should be very thin and it has been found that it is desirable to protect the thin film with a transparent, clear film of a material such as cellulose acetate or some other plastic. In such a combination, the user applies the point of the stylus to the protective film of cellulose acetate or other material and the pressure is transmitted through this film, and through the underlying light colored film to the coating on the backing member with the result that a line appears which is dark colored depending upon the color of the backing member and shows through the overlying films. This line or as many other lines as are put on the writing device will remain in existence until the light colored film is parted or separated from the surface of the backing member whereupon the written matter or drawings disappear.

The requirement for the two films adds materially to the cost of these writing devices and creates manufacturing problems by reason of the necessity of handling and securing two films together and to a backing member, these films having somewhat different properties which will manifest themselves in objectionable wrinkles unless careful precautions are taken to avoid such occurrences. Heretofore, efforts have been made to provide a single film which would take the place of the two films in such writing devices but such efforts have not been completely successful and these devices have been continued to be manufactured with the two films as described above. However, I have been able in accordance with the present invention to create or impart surfaces to films, such, for example, as cellulose acetate, such that these films can be used to replace the two films which have been previously used in making such writing devices. The films which may be produced in accordance with the present invention are not only satisfactory for substitution in place of the two films previously used, but these new films offer certain performance advantages over the combination of films previously used besides being cheaper and easier to handle from the manufacturing standpoint.

Reference may now be had to the drawings for a description of an apparatus and process which have been used to treat surfaces of various plastic films with honing liquids in accordance with the present invention. The reference numeral 5 designates a supply roll of a suitable film, the film being designated at 6. The film is unwound from the roll 5, passes underneath the guide and support roll 7 and then is rewound on a draw roll 8 which is suitably driven. Preferably, the roll 7 is disposed below the rolls 5 and 8 as shown so as to facilitate the draining and collection of the honing liquid which is employed to hone the surface of the film 6. A tray indicated generally at 10 having upwardly inclined sides is located underneath the guide roll 7 and extends for a substantial distance on opposite sides thereof. The tray 10 is provided with upturned ends 11—11 (Fig. 1) and sides 12—12 (Fig. 2). The honing liquid is made up in sufficient quantities so that a pool 13 stands in the bottom of the tray 10 as shown in Fig. 1.

The honing liquid (the composition of which will be described in detail hereinafter) consists of a liquid, e. g., water, and suspended particles of abrasive material, e. g., silica sand. It is continuously sprayed onto the bottom surface of the traveling film 6 from a plurality of nozzles 14—14 mounted on a header 15 for the honing liquid. The film is supported or backed up by the guide roll 7 as it is being sprayed with said honing liquid. The header 15 is supported by shafts 16—16 projecting from opposite ends thereof which have a sliding fit in sleeves 17—17 mounted in the opposite sides 12 of the tray 10. The header 15 and the nozzles 14 are reciprocated or shifted sidewise back and forth so as to provide uniform treatment of the surface of the film 6. Such reciprocation is obtained by means of a reversing screw 18 which is supported on a frame 20 and driven or rotated by means of a pulley 21. The reversing screw 18 and the header 15 operate on the same principle as the so-called level wind fishing reel with the header 15 having a button 22 which engages in the grooves in the lever wind screw 18.

The honing liquid is supplied to the header 15 under suitable pressure through a flexible connection 23. Compressed air is supplied to each nozzle 14 through a flexible connection 24 attached thereto. The compressed air may be obtained from any suitable source such, for example, as an air compressor indicated diagrammatically at 25 having a supply line 26 which is connected with a header or manifold 27 provided with suitable nipples to which the flexible connections 24 may be connected.

The flexible connection 23 to the header 15 receives honing liquid under pressure from a line 24 connected to the discharge side of a constant delivery pump indicated diagrammatically at 30. The pump 30 draws in the honing liquid through an intake line 31 which connects with the bottom of the tray 10 as shown. It will be seen that the pump 30, in addition to delivering the honing liquid to the nozzles 14 under suitable pressure, also serves as a recirculating pump with the result that the honing liquid is sufficiently agitated to prevent settling of the particles of abrasive material which are contained therein.

Depending upon the composition of the honing liquid, it may or may not be necessary or desirable to wash the film 6 after it passes the liquid honing sprays. Accordingly, an extension 32 of the tray 10 is provided on the side toward the wind-up roll 8. A header or pipe 33 is suitably located which has spray openings in the top thereof through which water may be sprayed onto the traveling film 6. The spray water is delivered to the header 33 from a constant delivery pump 34 through a line 35. The water drains off from the film 6 and collects in the lower end of the extension 32, as indicated, from which it is withdrawn through a conduit 36 into the pump 34 for recirculation.

After passing the rinsing spray, the film 6 is wiped dry by passage over a rubber wiping blade or squeegee 37. If desired, the film 6 may be further dried by hot air, radiant heat, or a combination before it is rewound on the roll 8. A suitable drier is indicated diagrammatically at 38.

Honing liquids having the following formulations have been successfully used to hone various plastic films, particularly cellulose acetate, so as to impart or develop finishes to the surfaces of the films having the desired characteristics and properties.

*Example 1*

| | Percent by weight |
|---|---|
| Silica sand | 20 |
| Water | 80 |

*Example 2*

| | |
|---|---|
| Silica sand | 20 |
| Potassium hydroxide | 15 |
| Maleic anhydride | 3 |
| Polyoxyethylene lauryl alcohol (Bridget #35 Atlas Powder Co.) | 2 |
| Water | 60 |

*Example 3*

| | |
|---|---|
| Silica sand | 40 |
| Sodium hydroxide | 15 |
| Polyoxyethylene lauryl alcohol (Bridget #35) | 5 |
| Water | 40 |

*Example 4*

| | |
|---|---|
| Pumice | 30 |
| Potassium hydroxide | 10 |
| Succinic anhydride | 4 |
| Polyoxyethylene lauryl alcohol (Bridget #35) | 4 |
| Water | 52 |

*Example 5*

| | |
|---|---|
| Silica sand | 20 |
| Potassium hydroxide | 15 |
| Stannous chloride | 3 |
| Water | 62 |

*Example 6*

| | |
|---|---|
| Silica sand | 32 |
| Ox gall | 2 |
| Water | 66 |

*Example 7*

| | |
|---|---|
| Silica sand | 34 |
| Silicone emulsion (Dow Corning 7) | 1 |
| Water | 65 |

*Example 8*

| | |
|---|---|
| Silica sand | 32 |
| Stearic chromic chloride ("Quillon" Du Pont) | 2 |
| Water | 66 |

In the foregoing examples the silica sand may be replaced not only with pumice as shown in Example 4 but also by other abrasive materials including alumina, carborundum, graphite, talc, and ground nut shells. The silica sand, pumice or other abrasive material may have a particle size within the range of 50 to 300 mesh. Within rather broad limits, the formulations are not particularly critical in regard to the ratio of liquid component, e. g., water to the dispersed abrasive material, e. g., silica sand, but there should be enough water or other fluid so that the material may be easily sprayed and pumped. Because of the abrasive nature of the sprays and of the liquid itself, the various parts of the equipment which are subject to contact with the honing liquid may be formed of suitable abrasive-resistant material or protected with abrasive-resistant enamels of various types known in the art.

The formulations which contain alkali will saponify various films such as cellulose acetate, the saponification action being dependent not only on the concentration and type of alkali used but also on the temperature of the honing liquid. Potassium hydroxide acts in a shorter time than does sodium hydroxide, and in general hotter solutions serve to reduce the time requirements.

When a honing liquid is employed having the formulation of Example 5 on a cellulose acetate film, the honed surface of the film is electrically conductive and may be plated by passage through a plating bath, e. g., a solution of copper sulfate. Films having such electrically conductive honed surfaces may be used for a wide variety of purposes. For example, radio or other electrical circuits may be deposited on such honed surfaces and the films used for miniature radio or other electrical devices. The plated electrically conductive films may also be used to advantage in manufacturing electrical condensors or capacitors in places of the metallized papers now used that are obtained by the so-called vacuum metallizing process.

The formulation given in Example 7 serves to leave a minute deposit of the silicone resin on the abraded or honed surface of the plastic and thereby imparts to the film certain unique properties not previously obtainable. Apparently the amount of silicone resin that is permanently associated with the film is very minor because the honing liquid can be used over and over again without any apparent change in concentration of the silicone resin content. The silicone honed surface is cohesive.

A honed cellulose acetate film especially suited for use with the writing devices or duplicators of the type described above was obtained by using the formulations set forth in Examples 2, 3 and 4 with the film traveling at a speed of approximately 20 to 50 feet per minute past the spray nozzles. The output pressure of the circulating pump was approximately 10 to 20 pounds per square inch and air pressure delivered to the nozzles was approximately 90 pounds per square inch.

The surface of a film of cellulose acetate when honed with a honing liquid formulated according to Examples 2, 3 or 4 becomes distinctly hydrophilic, whereas the non-honed surface of the film remains hydrophobic. In addition to being useful for the particular purpose mentioned, the honed cellulose acetate films may also be used for offset printing plates or merely for the attractive frosted appearance which the films have on the honed surface side. It has also been noted that honing of the one surface of a film in accordance with the present invention seems to definitely change capacity of the film to acquire electrostatic charges. For example, a cellulose acetate film honed with the formulation of Example 2 will lie extremely flat and close to the tacky impressionable surface of a backing member of a writing device or duplicator of the type referred to above. This is a desirable feature for such a film when used for this purpose.

In addition to incorporating silicone resins or alkalies in the honing liquids, it will be understood that other chemicals or modifying agents may be included as needed and as desired. Other films which have been successfully treated with the formulations set forth in the examples above include "Mylar" (du Pont polyester resin film), ethyl cellulose film, acrylate films (e. g., Plexiglas and Lucite), polystyrene films and regenerated cellulose. Because of its clearness, availability and dimensional stability, cellulose acetate film has been used most extensively in connection with the present invention.

Since certain further changes and modifications may be made in the embodiments of the invention outlined above and different embodiments of the invention may be made and developed by those skilled in the art in view of the foregoing disclosure, all matter disclosed above or shown in the accompanying drawings is intended to be interpreted as illustrative and not in a limiting sense.

What is claimed as new is:

1. The method of treating the surface of cellulose acetate film which comprises spraying a traveling web of said film with water containing finely divided abrasive, an alkali metal hydroxide and an anhydride of a lower alkyl dibasic acid.

2. The method of treating the surface of cellulose acetate film which comprises spraying a traveling web of said film with water containing finely divided silica sand, potassium hydroxide and maleic anhydride.

References Cited in the file of this patent

UNITED STATES PATENTS

| | | |
|---|---|---|
| Re. 23,064 | Tirrell | Dec. 14, 1948 |
| Re. 23,422 | Perry | Oct. 23, 1951 |
| 633,489 | Revalk | Sept. 19, 1899 |
| 673,576 | Huntley | May 7, 1901 |
| 682,342 | Radell | Sept. 10, 1901 |
| 1,413,060 | Roberts | Apr. 18, 1922 |
| 1,560,312 | Pitfield | Nov. 3, 1925 |
| 1,969,481 | Slack | Aug. 7, 1934 |
| 2,034,308 | Morgan | Mar. 17, 1936 |
| 2,036,387 | Babcock et al. | Apr. 7, 1936 |
| 2,040,715 | Smith | May 12, 1936 |
| 2,312,623 | Brooks et al. | Mar. 2, 1943 |
| 2,448,316 | Lesavoy | Aug. 31, 1948 |